US008874174B2

(12) United States Patent
Singh et al.

(10) Patent No.: US 8,874,174 B2
(45) Date of Patent: Oct. 28, 2014

(54) EXTENDING INSTANT AUDIBLES WHILE IN A VOICE CALL

(75) Inventors: Satpreet Singh, Plano, TX (US); Sundara Senthil, Tamil Nadu (IN)

(73) Assignee: Samsung Electronics Co., Ltd., Suwon-Si (KR)

( * ) Notice: Subject to any disclaimer, the term of this patent is extended or adjusted under 35 U.S.C. 154(b) by 736 days.

(21) Appl. No.: 12/387,202

(22) Filed: Apr. 29, 2009

(65) Prior Publication Data

US 2010/0279658 A1 Nov. 4, 2010

(51) Int. Cl.
*H04B 1/38* (2006.01)
*H04M 1/725* (2006.01)
*H04M 1/64* (2006.01)

(52) U.S. Cl.
CPC ............ *H04M 1/645* (2013.01); *H04M 1/7255* (2013.01)
USPC ..... 455/567; 455/422.1; 455/401; 455/412.2; 455/413

(58) Field of Classification Search
USPC ........ 455/412.1, 412.2, 413, 414.1, 415, 417, 455/420, 550.1, 556.1, 556.2; 379/67.1, 75, 379/85, 88.18, 68, 81, 82, 84, 88.08
See application file for complete search history.

(56) References Cited

U.S. PATENT DOCUMENTS

| | | | | |
|---|---|---|---|---|
| 7,330,721 | B2 * | 2/2008 | Bhatia et al. ................ | 455/422.1 |
| 7,769,364 | B2 * | 8/2010 | Logan et al. ................. | 455/413 |
| 2005/0153729 | A1 | 7/2005 | Logan et al. | |
| 2008/0057926 | A1 * | 3/2008 | Forstall et al. ................ | 455/415 |
| 2008/0200152 | A1 * | 8/2008 | Moore ........................... | 455/413 |
| 2008/0261564 | A1 * | 10/2008 | Logan ........................... | 455/413 |
| 2009/0097633 | A1 * | 4/2009 | James et al. ............. | 379/215.01 |
| 2009/0143007 | A1 * | 6/2009 | Terlizzi ........................ | 455/3.06 |
| 2009/0143049 | A1 * | 6/2009 | Chen et al. .................. | 455/412.2 |
| 2009/0170480 | A1 * | 7/2009 | Lee ............................... | 455/414.1 |
| 2009/0191848 | A1 * | 7/2009 | Helferich ..................... | 455/412.1 |
| 2009/0279683 | A1 * | 11/2009 | Gisby et al. .............. | 379/201.02 |
| 2010/0150332 | A1 * | 6/2010 | Soo et al. .................. | 379/207.02 |
| 2010/0220850 | A1 * | 9/2010 | Gisby et al. .............. | 379/211.02 |

OTHER PUBLICATIONS

European Search Report dated Dec. 18, 2012 in connection with European Patent Application No. 09179427.1, 6 pages.

* cited by examiner

*Primary Examiner* — Thienvu Tran
*Assistant Examiner* — Christopher Lo

(57) ABSTRACT

For use in a wireless communication network, a method for communicating audible messages is provided. The method includes establishing a call. The method also includes determining if the mobile device is configured for playing a plurality of pre-recorded audible messages during the call. The method further includes displaying a plurality of graphical images, each graphical image corresponding to at least one pre-recorded audible message. The method still further includes receiving an indication that one of the graphical images has been pressed. The method also includes playing a pre-recorded audible message corresponding to the one graphical image that has been pressed.

20 Claims, 6 Drawing Sheets

EMERGENCY AUDIBLES ENABLE
VOCAL INFORMATION TO EMERGENCY
OPERATOR WITHOUT SPEAKING:
 - UNABLE TO SPEAK DURING MEDICAL
   EMERGENCIES
 - RISKY TO SPEAK DURING AN ARMED
   INTRUSION

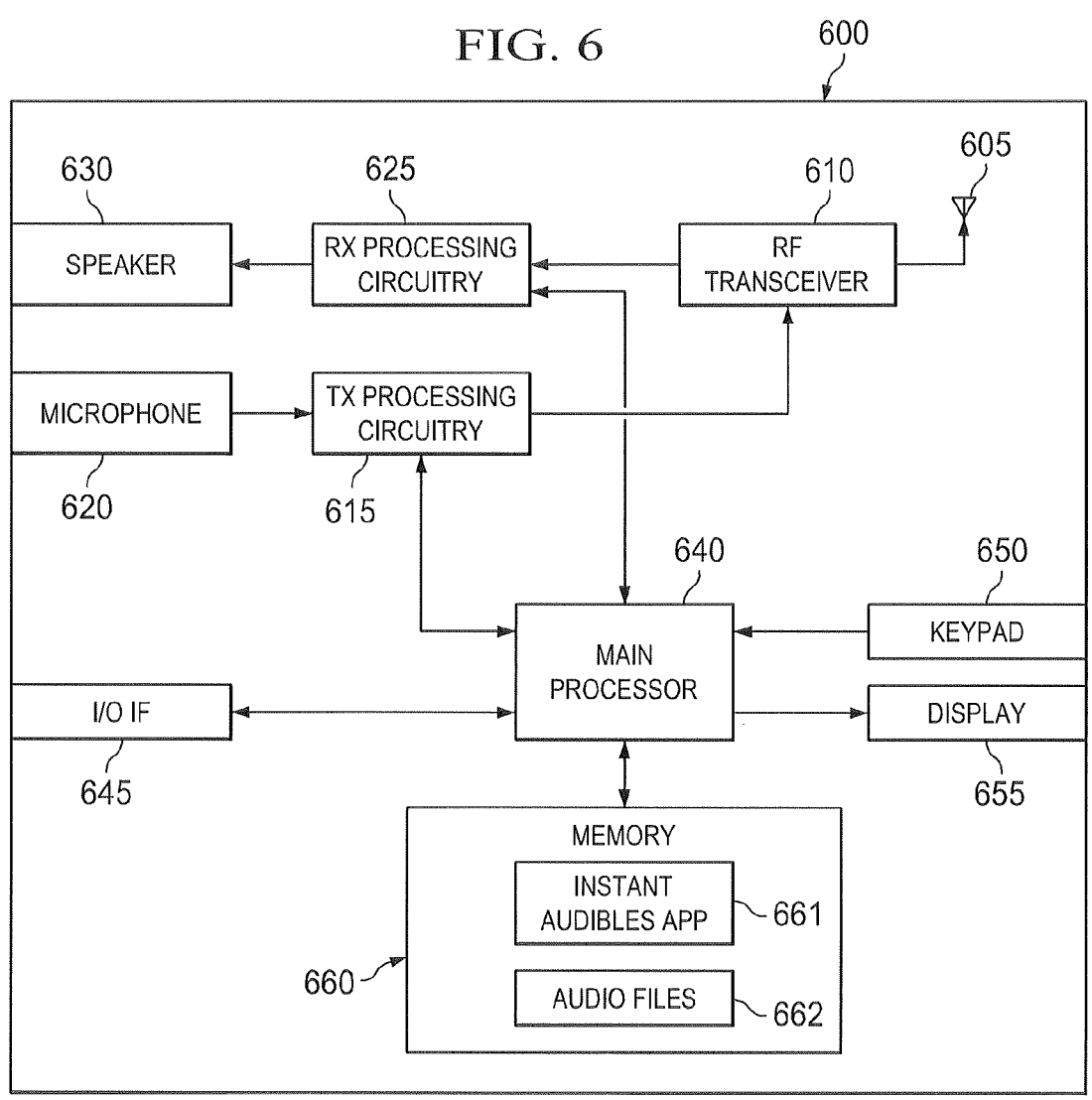

EXTENDING INSTANT AUDIBLES WHILE IN A VOICE CALL

TECHNICAL FIELD OF THE INVENTION

The present application relates generally to wireless communications and, more specifically, to a method for providing audible communication through pre-recorded, mobile phone-enabled messages.

BACKGROUND OF THE INVENTION

In phone conversations between two or more people, it is typical for callers to exchange or repeat common words and phrases, such as "okay" or "cool". Often, these words are repeated without any style or creativity. Such repetitive speech patterns can make a conversation dull and uninteresting.

Sometimes, such as in meetings, a dialed party is unable to speak on the phone, but still wishes to convey a message to the caller. The dialed party may want the caller to know that the dialed party is currently unavailable but will call back shortly. Or the dialed party may want the caller to hold because the dialed party will be available momentarily.

In other situations, such as emergencies, a caller may unable to speak, but still need to convey a message for help.

Therefore, a means for creatively expressing messages for entertainment, or to communicate when speech is difficult or impractical, is needed.

SUMMARY OF THE INVENTION

A mobile device for use in a wireless communication network is provided. The mobile device is configured for wireless voice communication. The mobile device includes a plurality of pre-recorded audible messages. The mobile device also includes plurality of graphical images, each graphical image corresponding to at least one pre-recorded audible message.

A method for communicating audible messages is provided. The method includes establishing a call. The method also includes determining if the mobile device is configured for playing a plurality of pre-recorded audible messages during the call. The method further includes displaying a plurality of graphical images, each graphical image corresponding to at least one pre-recorded audible message. The method still further includes receiving an indication that one of the graphical images has been pressed. The method also includes playing a pre-recorded audible message corresponding to the one graphical image that has been pressed.

A second method for communicating audible messages is provided. The method includes receiving an indication of an incoming call. The method also includes displaying a plurality of graphical images, each graphical image corresponding to at least one of a plurality of pre-recorded audible messages. The method further includes receiving an indication that one of the graphical images has been pressed. The method still further includes connecting the incoming call. The method also includes playing a pre-recorded audible message corresponding to the one graphical image that has been pressed.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a wireless mobile device according to one embodiment of the present disclosure.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

In order to add creativity, style and humor to a phone conversation, a method and apparatus are disclosed. The method and apparatus allow pre-recorded audio messages to be injected into voice conversations. These pre-recorded audio messages are called instant audibles. Instant audibles can augment or replace live speech in order to add interest and creativity to a conversation, or when the speaker finds it difficult or impossible to speak in the speaker's own voice.

Figure 1:
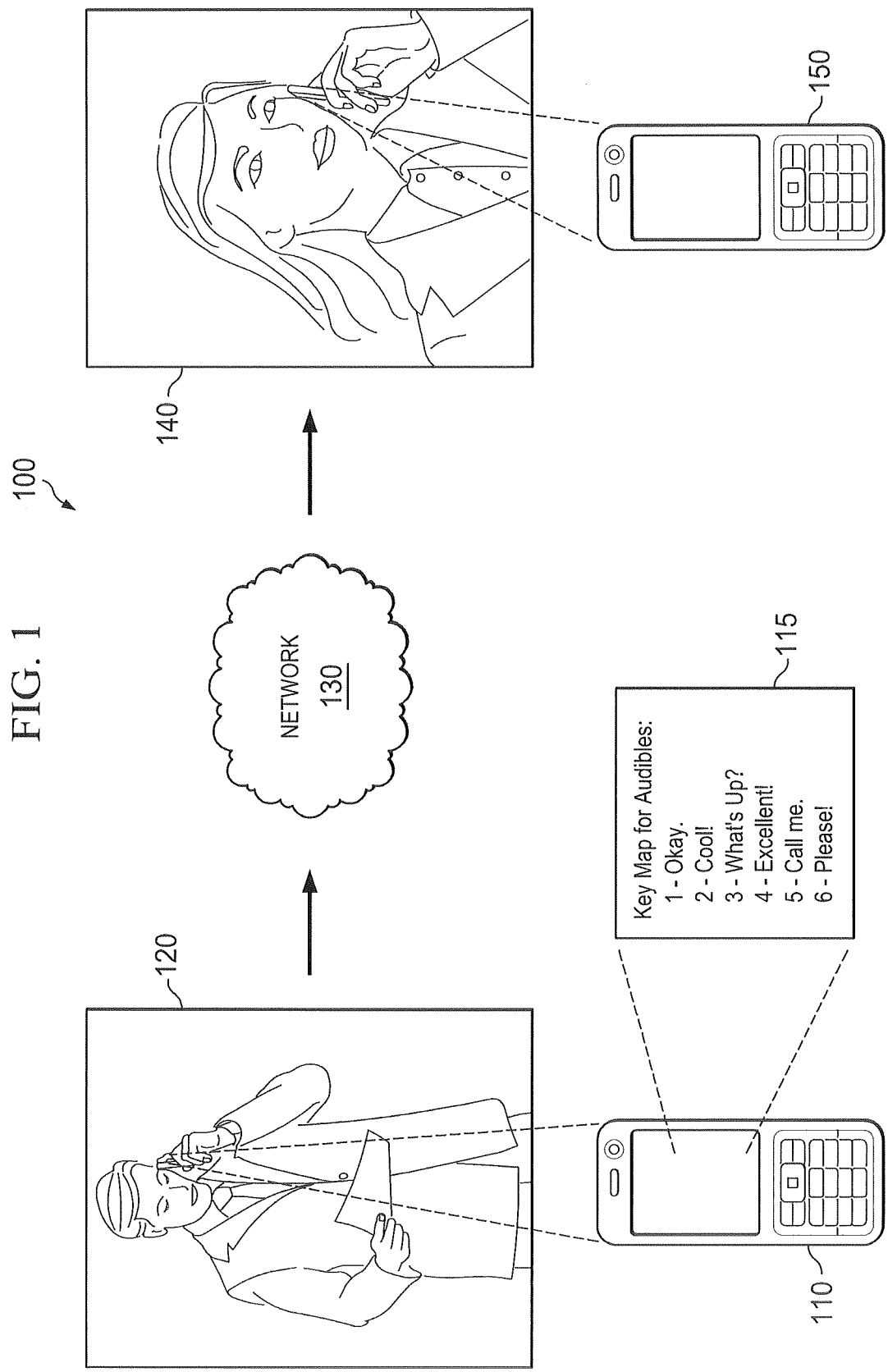
FIG. 1 is a block diagram illustrating a wireless communication environment that utilizes instant audibles according to one embodiment of the present disclosure.

FIG. 1 is a block diagram illustrating a wireless communication environment that utilizes instant audibles according to one embodiment of the present disclosure. The embodiment of wireless environment 100 shown in FIG. 1 is for illustration only. Other embodiments of wireless environment 100 could be used without departing from the scope of the disclosure. Furthermore, it is understood that embodiments encompassing non-wireless communication are also contemplated. For example, instead of wireless communication environment 100, the communication environment could be wired, landline, Voice over IP, or any other environment configured for voice communication.

In wireless environment 100, mobile device 110 is engaged in wireless communication with mobile device 150 over network 130. For example, mobile user 120 could be using mobile device 110 to talk with mobile user 140. Mobile user 140, in turn, could be using mobile device 150 to talk with mobile user 120.

Mobile device 110 is configured with an instant audibles pack 115. In certain embodiments, instant audibles pack 115 may be a software module loaded on mobile device 110. The software module may be installed via a connection to a PC, downloaded from the Internet, obtained from a mobile service provider's network, or any other means of installing software into a mobile device. In certain embodiments, instant audibles pack 115 may be stored in the same file system of mobile device 110 where ringtones and other audio files are stored. In other embodiments, instant audibles pack 115 may be hardware that is connectable to, and removable from, mobile device 110. In still other embodiments, instant audibles pack 115 may be hardware or firmware, such as a chip, that is manufactured into mobile device 110.

Instant audibles pack 115 includes a number of pre-recorded audible messages. In certain embodiments, each audible message may be a spoken word or phrase. Each spoken word or phrase may be in the voice of a third party. Alternatively, each spoken word or phrase may be pre-recorded by mobile user 120 in the user's own voice. In other embodiments, an audible message may include a non-verbal sound. The non-verbal sound may be a human sound, such as laughter or coughing; an animal sound, such as a bark, growl, or quack; a natural or man-made sound, such as thunder or music; or any other type of audible sound.

In certain embodiments, each audible message in instant audibles pack 115 is associated with a particular key or button on mobile device 110. For example, the audible message "Okay" may be associated with the "1" key on the keypad of mobile device 110. During a conversation between mobile users 120 and 140, mobile user 120 may wish to acknowledge something said by mobile user 140. Rather than verbally speaking a response such as "okay", mobile user 120 may press the "1" key during the conversation. When mobile user 120 presses the "1" key, an audible "okay" is spoken by mobile device 110, and can be heard by both mobile user 120 and mobile user 140. The mapping of keys and audibles on mobile device 110 can be changed by mobile user 120 at any time. In some embodiments, one key can correspond to a list of audibles from which mobile user 120 can select. Based upon usage, frequently played instant audibles can be moved to the top of the list.

Figure 2:
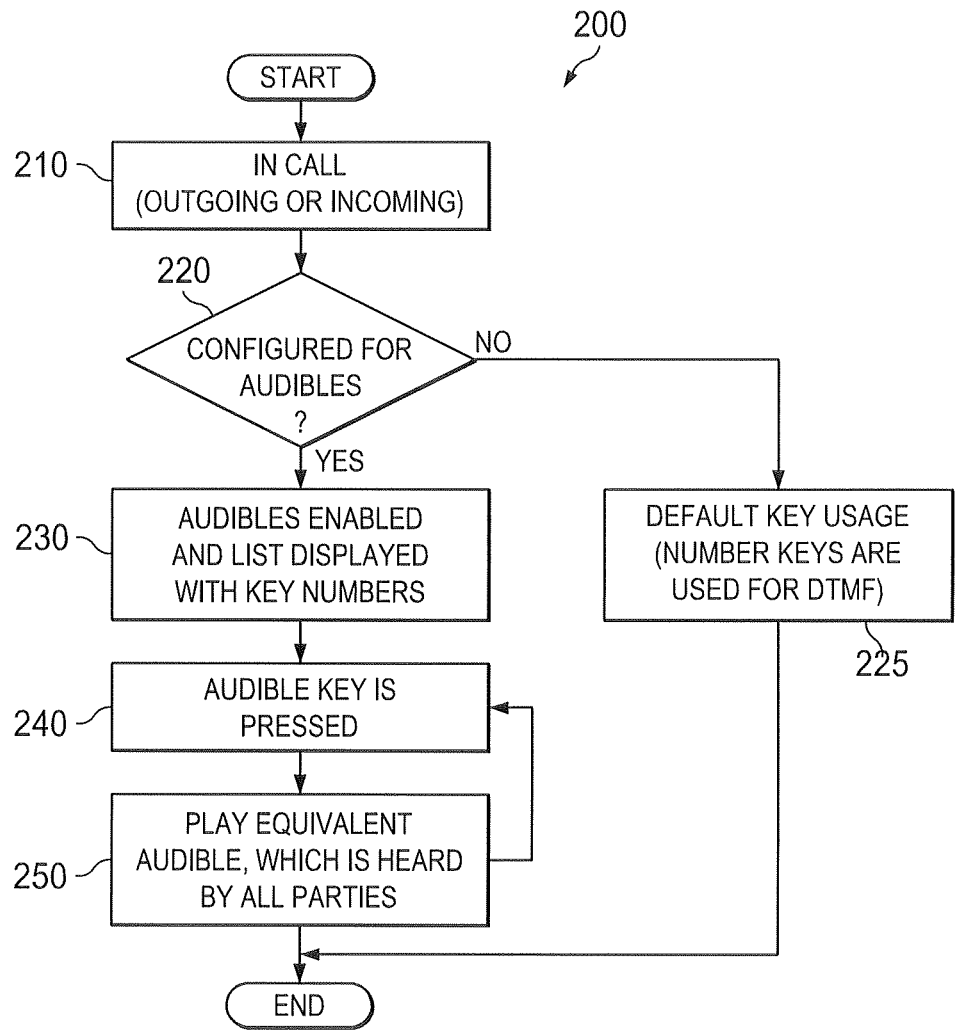
FIG. 2 is a flow diagram that illustrates a process for utilizing instant audibles according to one embodiment of the present disclosure.

FIG. 2 is a flow diagram that illustrates a process for utilizing instant audibles according to one embodiment of the present disclosure. The embodiment of the utilization process 200 shown in FIG. 2 is for illustration only. Other embodiments of the utilization process 200 could be used without departing from the scope of this disclosure.

In step 210, a call is established at a mobile device, such as mobile device 110. In certain embodiments, establishing the call could be defined as initiating an outgoing call at mobile device 110. In other embodiments, establishing the call could be defined as receiving an incoming call from another mobile device, such as mobile device 150.

In step 220, a determination is made as to whether mobile device 120 is configured to enable the use of instant audibles for the call 210. This determination is made based on the configuration of mobile device 110 and the type of call 210 that is in progress. For example, in some embodiments, a mobile device without an installed instant audibles pack would not be able to produce instant audibles sounds. In other embodiments, certain types of calls, such as a call to access voice mail, would not permit the use of instant audibles.

If mobile device 110 is not configured to enable the use of instant audibles for call 210, then the process moves to step 225. In step 225, the keypad of mobile device 110 is defaulted to its normal configuration, such as a dual-tone multi-frequency (DTMF) configuration. Alternatively, if mobile device 110 is configured to enable the use of instant audibles for call 210, then the process moves to step 230. In step 230, the instant audibles are enabled and a key on the keypad of mobile device 110 is assigned to each audible. A list of audibles is displayed on the screen of mobile device 110, along with the corresponding key for each audible. The process then moves to step 240.

During call 210, if the user of mobile device 110 wants to communicate an audible message, then the user may press one of the keys on mobile device 110 that corresponds to a particular instant audible, as seen in step 240. In step 250, when a key corresponding to one of the instant audibles is pressed, the appropriate instant audible is played. The instant audible can be heard by the user of mobile device 110, and by any other parties on call 210. Steps 240 and 250 may be repeated as many times as desired by the user of mobile device 110 to communicate the same or different audibles.

Figure 3:
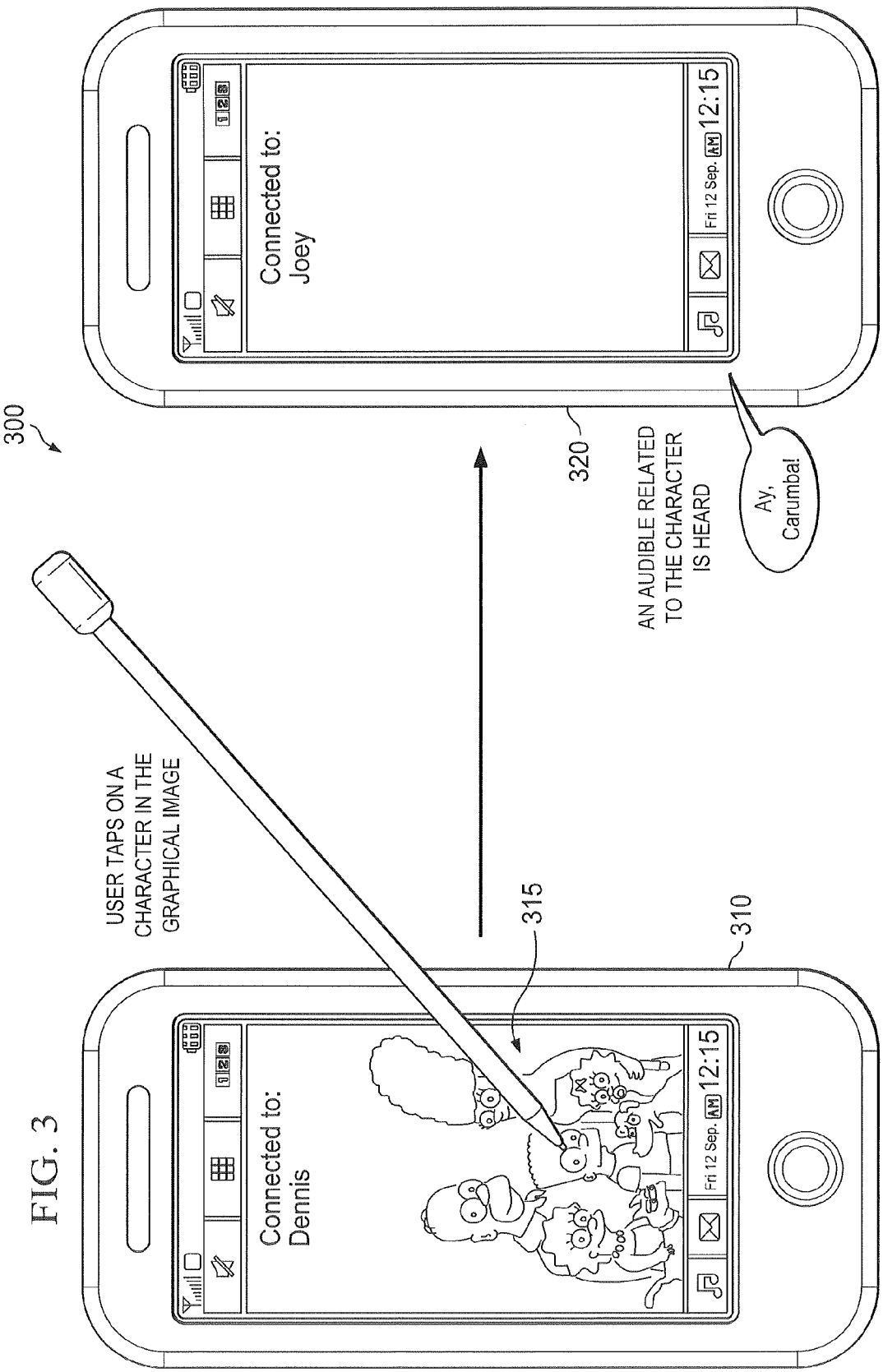
FIG. 3 illustrates a wireless communication event utilizing an entertainment audibles pack according to one embodiment of the present disclosure.

FIG. 3 illustrates a wireless communication event utilizing an entertainment audibles pack according to one embodiment of the present disclosure. The embodiment of the wireless communication event 300 shown in FIG. 3 is for illustration only. Other embodiments of the wireless communication event 300 could be used without departing from the scope of the disclosure.

In communication event 300, mobile device 310 is engaged in wireless communication with mobile device 320. Mobile device 310 is configured with entertainment audibles pack 315. In certain embodiments, entertainment audibles pack 315 may be a software module loaded on mobile device 310. The software module may be installed via a connection to a PC, downloaded from the Internet, obtained from a mobile service provider's network, or any other means of installing software into a mobile device. In other embodiments, entertainment audibles pack 315 may be hardware that is connectable to, and removable from, mobile device 110. In still other embodiments, entertainment audibles pack 315 may be hardware or firmware, such as a chip, that is manufactured into mobile device 310.

Entertainment audibles pack 315 includes a number of pre-recorded audible messages, including sounds and/or spoken words. In certain embodiments, entertainment audibles pack 315 also includes graphical images that can be displayed on the screen of mobile device 310. The audible messages and graphical images of entertainment audibles pack 315 are related to media and figures in popular entertainment culture. Examples of popular entertainment culture include, but are not limited to, television shows, movies, music, political figures, and sports teams and individuals. For example, entertainment audibles pack 315 features humorous audibles and graphical images from a popular television show.

In certain embodiments, the graphical images and audibles of entertainment audibles pack 315 are linked, such that each graphical image, or part of an image, is associated with a particular audible. Touching, clicking, tapping, or otherwise choosing a graphical image results in the particular audible being played. For example, during a conversation between users of mobile devices 310 and 320, the user of mobile device 310 taps on a graphical character image of entertainment audibles pack 315. The audible associated with the graphical image is then played on mobile device 310. The audible can be heard and enjoyed by the users of both mobile devices 310 and 320. In certain embodiments, each graphical image is associated with multiple audibles. Each time the graphical image is tapped, one of the multiple audibles is randomly selected and played.

Figure 4:
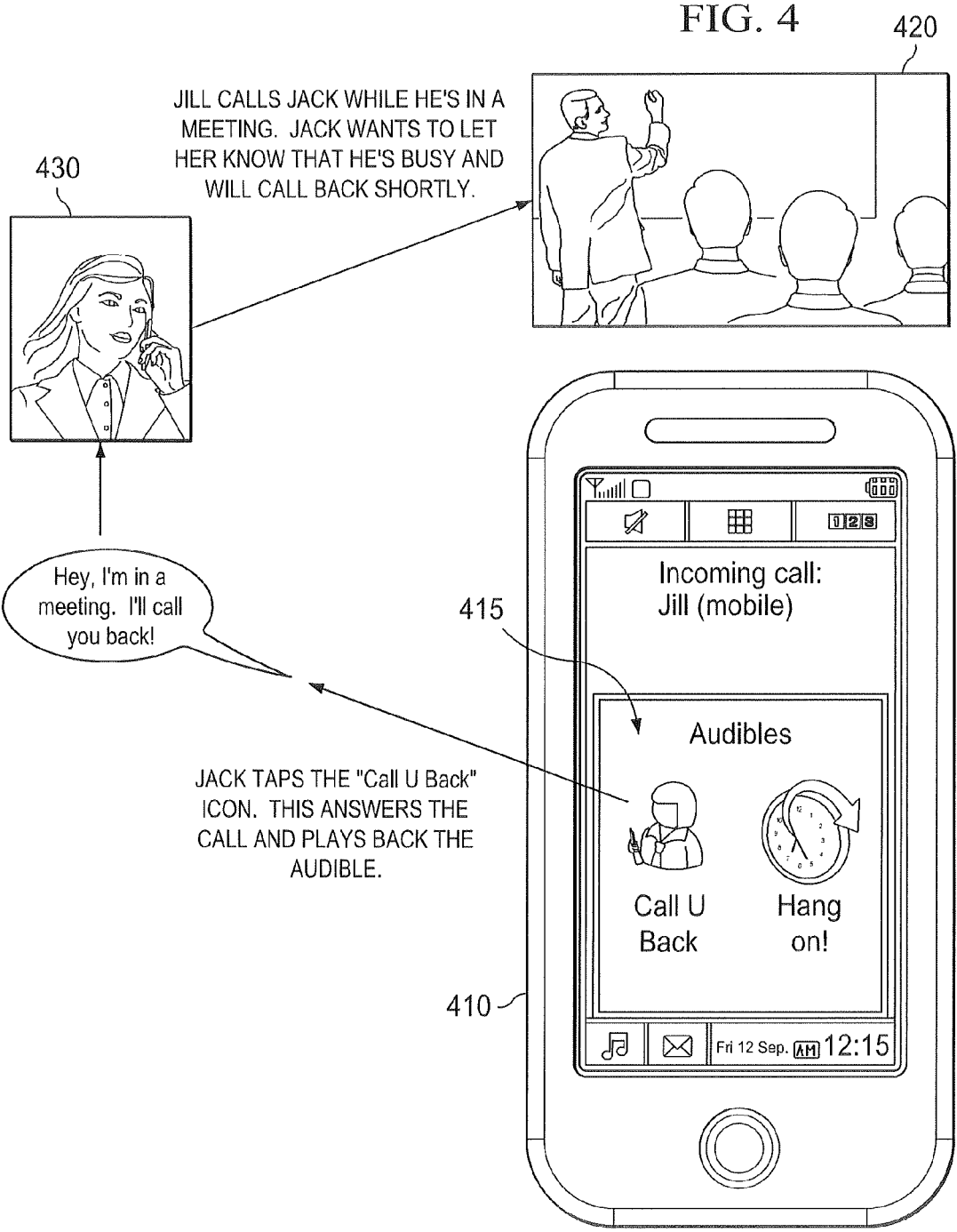
FIG. 4 illustrates a wireless communication event utilizing speechless voice response audibles according to one embodiment of the present disclosure.

FIG. 4 illustrates a wireless communication event utilizing speechless voice response audibles according to one embodiment of the present disclosure. The embodiment of the wireless communication event 400 shown in FIG. 4 is for illustration only. Other embodiments of the wireless communication event 400 could be used without departing from the scope of the disclosure.

In communication event 400, mobile device 410 is configured with speechless voice response audibles 415. As described with respect to other audibles packs, the speechless voice response audibles 415 can be a part of any type of software, firmware, or hardware installed or otherwise loaded into mobile device 410. The speechless voice response audibles 415 include audibles that are useful for communicating a message to a caller whenever actual speech is difficult, impossible or impractical.

As an example, suppose caller 430 calls mobile user 420 while mobile user 420 is in a meeting. Mobile user 420 is unable to talk during the meeting, but he wants to let caller 430 know that he will call back shortly. When mobile user 420 sees the incoming call from caller 430 on his mobile device 410, he can tap a "call u back" icon or image. Tapping on the "call u back" icon answers the call and plays an audible message that can be heard by caller 430. Mobile user 420 can then tap on other icons, if he chooses, to play other appropriate messages to caller 430.

Figure 5:
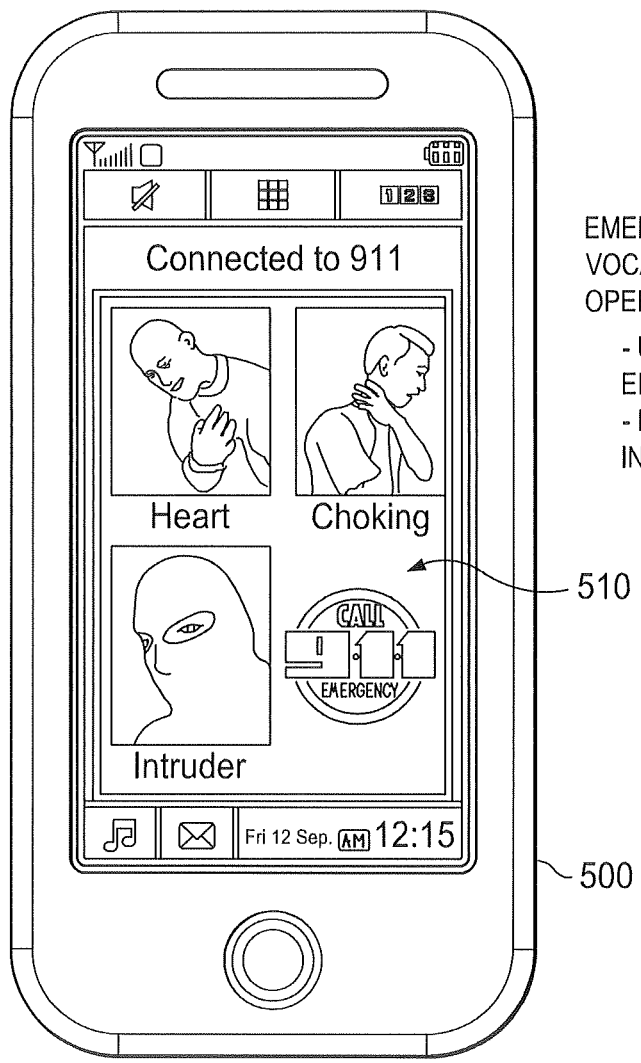
FIG. 5 illustrates a mobile device configured to communicate emergency audibles according to one embodiment of the present disclosure.

FIG. 5 illustrates a mobile device configured to communicate emergency audibles according to one embodiment of the present disclosure. Mobile device 500 is configured with emergency audibles 510. As described with respect to other audibles packs, the emergency audibles can be a part of any type of software, firmware, or hardware installed or otherwise loaded into mobile device 500. The emergency audibles 510 include audibles that are useful for communicating an emergency message whenever actual speech is difficult, impossible, or risky.

As an example, suppose the user of mobile device 500 is choking or is experiencing another medical emergency that makes it impossible or difficult to speak. The user of mobile device 500 can dial 911, then press or tap an emergency audibles icon that corresponds to the type of medical emergency that she is experiencing. Tapping the icon will play a recorded message that the 911 operator can hear. As another example, suppose the user of mobile device 500 hears an intruder in her home. The user, believing that it would be risky to speak, can dial 911, or any other emergency contact, then press or tap the "intruder" icon. Tapping the "intruder" icon will play a record message that the emergency contact can hear, while allowing the user of mobile device 500 to keep silent.

FIG. 6 illustrates a wireless mobile device according to one embodiment of the present disclosure. Wireless mobile device 600 comprises antenna 605, radio frequency (RF) transceiver 610, transmit (TX) processing circuitry 615, microphone 620, and receive (RX) processing circuitry 625. Wireless mobile device 600 also comprises speaker 630, main processor 640, input/output (I/O) interface (IF) 645, keypad 650, display 655, and memory 660. Memory 660 further comprises instant audibles program or application 661 and audio files 662.

Radio frequency (RF) transceiver 610 receives from antenna 605 an incoming RF signal transmitted by a base station of a wireless network, such as network 130. Radio frequency (RF) transceiver 610 down-converts the incoming RF signal to produce an intermediate frequency (IF) or a baseband signal. The IF or baseband signal is sent to receiver (RX) processing circuitry 625, which produces a processed baseband signal by filtering, digitizing the baseband or IF signal, additional filtering, if necessary, demodulation and/or decoding. Receiver (RX) processing circuitry 625 transmits the processed baseband signal to speaker 630 (i.e., voice data) or to main processor 640 for further processing (e.g., web browsing).

Transmitter (TX) processing circuitry 615 receives analog or digital voice data from microphone 620 or other outgoing baseband data (e.g., web data, e-mail, interactive video game data) from main processor 640. Transmitter (TX) processing circuitry 615 encodes, modulates, multiplexes, and/or digitizes the outgoing baseband data to produce a processed baseband or IF signal. Radio frequency (RF) transceiver 610 receives the outgoing processed baseband or IF signal from transmitter (TX) processing circuitry 615. Radio frequency (RF) transceiver 610 up-converts the baseband or IF signal to a radio frequency (RF) signal that is transmitted via antenna 605.

In an advantageous embodiment of the present disclosure, main processor 640 is a microprocessor or microcontroller. Memory 660 is coupled to main processor 640. According to an advantageous embodiment of the present disclosure, part of memory 660 comprises a random access memory (RAM) and another part of memory 660 comprises a non-volatile memory, such as Flash memory, which acts as a read-only memory (ROM).

Main processor 640 controls the overall operation of wireless device 600. In one such operation, main processor 640 controls the reception of forward channel signals and the transmission of reverse channel signals by radio frequency (RF) transceiver 610, receiver (RX) processing circuitry 625, and transmitter (TX) processing circuitry 615, in accordance with well-known principles. In another operation, main processor 640 executes instant audibles application 661 stored in memory 660 in order to generate audibles, which may be stored in audio files 662.

Main processor 640 is capable of executing other processes and programs resident in memory 660. Main processor 640 can move data into or out of memory 6,50, as required by an executing process. Main processor 640 is also coupled to I/O interface 645. I/O interface 645 provides mobile device 600 with the ability to connect to other devices such as laptop computers and handheld computers. I/O interface 645 is the communication path between these accessories and main controller 640.

Main processor 640 is also coupled to keypad 650 and display unit 655. The operator of mobile device 600 uses keypad 650 to enter data into mobile device 600. Display 655 may be a liquid crystal display capable of rendering text and/or graphics from web sites. In certain embodiments, display 655 may be a touch-sensitive screen and keypad 650 may be displayed on the touch-sensitive screen of display 655. Alternate embodiments may use other types of displays.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a mobile device configured for wireless voice communication, said mobile device comprising:
   a display;
   a storage device storing a plurality of pre-recorded audible messages and a plurality of graphical images, each graphical image corresponding to at least one pre-recorded audible message;
   a transceiver; and
   a controller configured to:
      cause the display to display the plurality of graphical images prior to connecting an incoming call and in response to identifying the incoming call, and
      connect the incoming call and cause the transceiver to transmit a pre-recorded audible message in response to identifying one of the plurality of graphical images displayed on the display being pressed,
   wherein the display is configured to display a plurality of emergency icons corresponding to different types of emergencies in response to an emergency call being placed by the mobile device, each emergency icon corresponding to at least one audible message comprising audio informing an emergency contact of a type of emergency that an operator of the mobile device is experiencing without the operator being required to speak.

2. The mobile device as set forth in claim 1, wherein the plurality of graphical images comprises numbers on a key pad.

3. The mobile device as set forth in claim 1, wherein the plurality of pre-recorded audible messages comprises pre-recorded voice messages.

4. The mobile device as set forth in claim 1, wherein the plurality of pre-recorded audible messages comprises non-verbal audio recordings.

5. The mobile device as set forth in claim 1, wherein the plurality of pre-recorded audible messages are pre-recorded by a user of the mobile device in the user's own voice.

6. The mobile device as set forth in claim 1, wherein the plurality of pre-recorded audible messages comprises at least one emergency message.

7. The mobile device as set forth in claim 1, wherein the pre-recorded audible message is transmitted to be heard by a calling party associated with the incoming call and not played by any speaker located within the mobile device.

8. The mobile device as set forth in claim 1, wherein a mapping of the plurality of graphical images to the plurality of audible messages can be changed by a user of the mobile device.

9. For use in a mobile device configured for wireless voice communication, a method for communicating audible messages, the method comprising:
   responsive to receiving an indication of an incoming call, displaying a plurality of graphical images on a display of the mobile device prior to connecting the incoming call, each graphical image corresponding to at least one of a plurality of pre-recorded audible messages;
   responsive to receiving an indication that one of the graphical images displayed on the display has been pressed, connecting the incoming call and transmitting a pre-recorded audible message corresponding to the one graphical image that has been pressed;
   responsive to an emergency call being placed by the mobile device, displaying a plurality of emergency icons corresponding to different types of emergencies; and
   responsive to receiving an indication that one of the emergency icons displayed on the display has been pressed, transmitting an audible message comprising audio informing an emergency contact of a type of emergency that an operator of the mobile device is experiencing without the operator being required to speak.

10. The method as set forth in claim 9, wherein the plurality of graphical images comprises numbers on a key pad.

11. The method as set forth in claim 9, wherein transmitting the pre-recorded audible message comprises transmitting the pre-recorded audible message to be heard by a calling party associated with the incoming call and not played by any speaker located within the mobile device.

12. The method as set forth in claim 9, wherein at least one of the plurality of pre-recorded audible messages informs a caller of the incoming call that a user of the mobile device is unavailable.

13. The method as set forth in claim 9, wherein the plurality of pre-recorded audible messages are pre-recorded by a user of the mobile device in the user's own voice.

14. For use in a mobile device configured for wireless voice communication, a method for communicating audible messages, the method comprising:
   establishing, by the mobile device, a call;
   determining whether the mobile device is configured to play a plurality of pre-recorded audible messages during the call;
   responsive to establishing the call, displaying a plurality of graphical images on a display of the mobile device, each graphical image corresponding to at least one pre-recorded audible message, wherein displaying the plurality of graphical images comprises displaying a plurality of emergency icons corresponding to different types of emergencies when the call is an emergency call is placed by the mobile device, each emergency icon corresponding to at least one audible message comprising audio informing an emergency contact of a type of emergency that an operator of the mobile device is experiencing without the operator being required to speak; and
   responsive to receiving an indication that one of the graphical images displayed on the display has been pressed, sending a pre-recorded audible message corresponding to the one graphical image that has been pressed during the call.

15. The method as set forth in claim 14, wherein the plurality of graphical images comprise numbers on a key pad.

16. The method as set forth in claim 14, wherein the plurality of pre-recorded audible messages comprises pre-recorded voice messages.

17. The method as set forth in claim 14, wherein the plurality of pre-recorded audible messages comprises non-verbal audio recordings.

18. The method as set forth in claim 14, wherein the plurality of pre-recorded audible messages are pre-recorded by a user of the mobile device in the user's own voice.

19. The method as set forth in claim 14, wherein sending the pre-recorded audible message comprises transmitting the pre-recorded audible message to be heard by a called party associated with the call and not played by any speaker located within the mobile device.

20. The method as set forth in claim 14, wherein a mapping of the plurality of graphical images to the plurality of audible messages can be changed by a user of the mobile device.

* * * * *